United States Patent [19]

Dechene

[11] Patent Number: 4,698,075
[45] Date of Patent: Oct. 6, 1987

[54] CONTROL SYSTEM FOR FLUID ABSORPTION SYSTEMS AND THE LIKE

[75] Inventor: Fernand J. Dechene, New Britain, Conn.

[73] Assignee: International Oxygen Company, Inc., New Britain, Conn.

[21] Appl. No.: 871,458

[22] Filed: Jun. 5, 1986

[51] Int. Cl.$^4$ .............................................. B01D 53/04
[52] U.S. Cl. ....................................... 55/163; 55/179; 55/274; 55/387
[58] Field of Search ................... 55/18, 21, 25, 26, 31, 55/33, 58, 62, 68, 74, 75, 162, 163, 179, 274, 387, 389

[56] References Cited

U.S. PATENT DOCUMENTS

| | | | |
|---|---|---|---|
| 3,176,444 | 4/1965 | Kiyonaga | 55/26 |
| 3,182,435 | 5/1965 | Axt | 55/62 X |
| 3,279,151 | 10/1966 | Kauer, Jr. et al. | 55/58 X |
| 3,399,510 | 9/1968 | Kauer, Jr. et al. | 55/58 X |
| 3,636,679 | 1/1972 | Batta | 55/62 X |
| 3,797,201 | 3/1974 | Tamura | 55/62 |
| 4,194,891 | 3/1980 | Earls et al. | 55/26 |
| 4,205,967 | 6/1980 | Sandman et al. | 55/179 X |
| 4,349,357 | 9/1982 | Russell | 55/21 |
| 4,545,790 | 10/1985 | Miller et al. | 55/179 X |
| 4,552,571 | 11/1985 | Dechene | 55/21 |

Primary Examiner—Robert Spitzer
Attorney, Agent, or Firm—Pearne, Gordon, McCoy & Granger

[57] ABSTRACT

An absorption-type oxygen generating system is disclosed in which the nitrogen components of compressed air passing through an absorption bed is absorbed, leaving a relatively pure oxygen effluent. Regeneration of the bed is provided by depressurizing the bed and recirculating a portion of the oxygen effluent to release the nitrogen previously absorbed therein. A flow divider has two branches each providing fixed orifice therein. One branch delivers a fixed percentage of the effluent to a depressurized absorption bed for regeneration thereof. The other branch delivers the remaining effluent to a storage tank. A pressure regulating valve is provided in the second branch to maintain a constant pressure differential across the orifice of the second branch so that a constant percentage of the oxygen effluent is delivered to the storage tank regardless of the back pressure existing in such tank. A two-stage, double-acting compressor powered by a hydraulic actuator is operable to compress the oxygen from the storage tank for filling conventional high pressure oxygen tanks.

17 Claims, 7 Drawing Figures

CONTROL SYSTEM FOR FLUID ABSORPTION SYSTEMS AND THE LIKE

BACKGROUND OF THE INVENTION

This invention relates generally to fluid absorption systems, and more particularly to a novel and improved flow divider for such systems which operates to maintain a substantially constant division of flow when working against a variable back pressure.

PRIOR ART

Fluid absorption systems for producing an enriched effluent are well known. For example, it is known to produce oxygen for medical and industrial purposes by passing air under pressure through Zeolite absorbing beds which remove the nitrogen component therefrom, producing an enriched oxygen effluent. Examples of such systems are described in U.S. Pat. Nos. 4,194,891 and 4,349,357, which are incorporated herein by reference.

In such systems, a plurality of absorption beds are provided which are interconnected by flow control systems so that each bed is operated through repeated cycles, including a pressurized absorption phase and a depressurized regeneration phase. During the pressurized absorption phase, air under pressure is supplied to a given bed which absorbs the nitrogen component of the air passing therethrough so that an oxygen-enriched component or effluent is produced.

In order to provide continued production, a portion of the effluent from one bed is recirculated through a depressurized bed to remove previously absorbed nitrogen therefrom and to regenerate such depressurized bed for a subsequent pressurized absorption phase. Such regeneration process does not require the recirculation of all of the effluent produced, and a portion of the effluent is removed as a system product.

In such systems, the flow divider often includes a network of fixed flow restrictors or orifices which are sized to divide the flow of effluent from one bed to provide the required volume of effluent for regeneration of another bed and to deliver the remaining effluent as a system product.

In such systems, however, inefficiencies are encountered when the product is delivered to a product storage container in which the pressure of the storage container fluctuates. These inefficiencies result when the volume of the product delivered during each cycle of operation decreases as the pressure in the product storage container builds up, with the result that an excessive volume of effluent is recirculated back through the depressurized bed. Consequently, the system efficiency deteriorates as the back pressure in the storage container builds up and excessive compressor power is required to produce a given amount of product.

SUMMARY OF THE INVENTION

In accordance with the present invention, a novel and improved control system is provided for fluid absorption systems in which the system efficiency is maintained substantially independently of the pressure of the product in the storage container. In the illustrated embodiment, which is incorporated into a system for producing oxygen, two series-connected flow restrictors or orifices interconnect the pressurized bed which is producing oxygen effluent to the depressurized bed which is being regenerated. A third fixed flow restrictor is connected through a back check valve and a pressure regulating valve between the pressurized bed and a product storage container. The pressure regulating valve maintains a substantially uniform back pressure on the third orifice independent of the back pressure in the storage chamber, so a constant amount of product is produced during each cycle.

Because the pressure regulating valve in effect isolates the back pressure in the storage chamber from the flow divider, the flow divider functions under constant conditions to deliver a uniform amount of product during each cycle of operation, and system efficiency is maintained regardless of the pressure in the storage container.

In accordance with this invention, a simple and reliable pressure regulator, in combination with appropriately selected fixed resistors which are also reliable and inexpensive, automatically maintains high system efficiency and reduces the power requirements of the system for a given output of product.

These and other aspects of this invention are illustrated in the accompanying drawings, and are more fully described in the following specification.

DETAILED DESCRIPTION OF THE DRAWINGS

Figure 1:
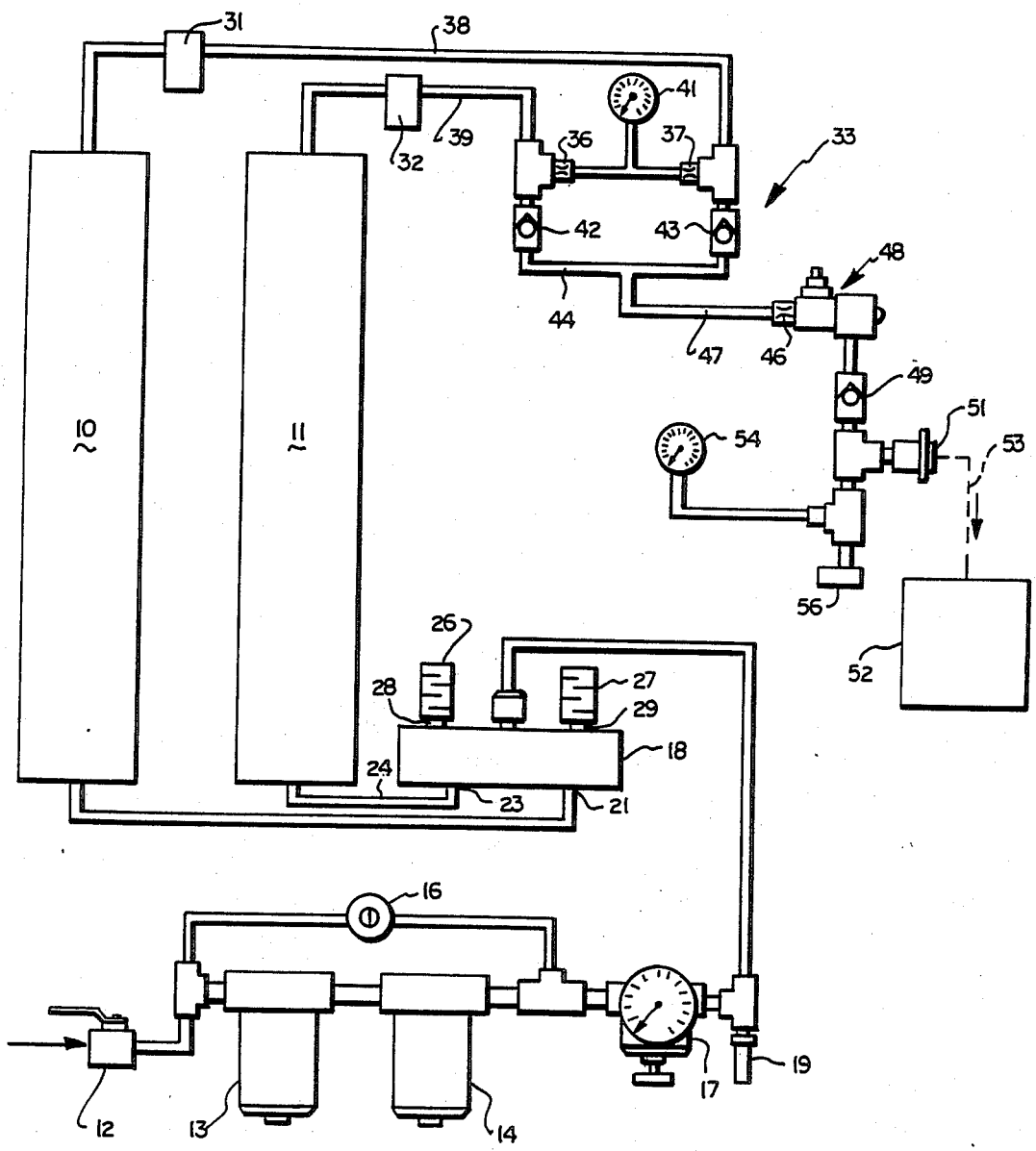
FIG. 1 is a schematic view of a two-bed absorption system for producing oxygen and incorporating a flow dividing system in accordance with this invention.

FIG. 1 schematically illustrates an oxygen generator in accordance with the present invention. The generator system includes a first bed 10 and a second bed 11, which are similar in size and which are filled with a suitable Zeolite material known to those skilled in the art which operates when under pressure to absorb the nitrogen component of compressed air passing therethrough. Alternately, a single sieve bed system or one utilizing three or more beds could be used. For example, see U.S. Pat. Nos. 3,436,344; 3,176,444; 3,636,679; and 3,797,201.

Compressed air from a compressor 11 is supplied by a compressor (not illustrated) through a shut-off valve 12, which is closed when the system is shut down and which is fully opened for normal operation of the system.

Absorption-type generators require clean, dry air, so the air first passes through a water trap and filter 13 and subsequently through a coalescing filter 14. The two filters 13 and 14 are connected in series and a pressure differential gauge 16 is connected in parallel with the two filters to provide an indication of the condition of the filters. When the differential pressure across the filters increases, an indication is provided that the filters should be serviced.

From the second filter 14 the compressed air is delivered to a pressure gauge and pressure regulator 17, which is manually set to the desired supply pressure for the system. Connected downstream from the pressure regulator 17 is a four-way solenoid operated valve 18 and a relief valve 19. A first controlled port 21 of the four-way valve 18 is connected through a pressure line 22 to one end of the first bed 10 and the other controlled port 23 is connected through a pressure line 24 to one end of the second absorption bed 11. First and second mufflers 26 and 27 are connected to the exhaust ports 28 and 29, respectively, of the four-way control valve 18.

The control valve 18 functions in one position to connect the lower end of the first bed 10 to the supply of compressed air and to simultaneously connect the lower end of the second bed 11 to the muffler 26. When the valve 18 is shifted to its other operated position, the connections are reversed and supply air under pressure is connected to the lower end of the second absorption bed 11 and the lower end of the first absorption bed 10 is connected to its associated exhaust muffler 27. The operation of the four-way valve, which is controlled by a timer (not illustrated), therefore results in the compression of one bed while the other is exhausted, and then the reverse condition, so that the beds are alternately pressurized and exhausted.

The upper ends of each of the absorption beds 10 and 11 are connected through associated isolation valves 31 and 32 to a flow divider system 33. The isolator valves are opened during normal operation of the system, and are closed when the system is shut down to ensure that moisture cannot enter into the beds and cause their deterioration.

The flow divider system 33 includes a dual branch orifice system. A first branch is provided by a pair of similar restrictors or orifices 36 and 37, which are connected in series with each other and are connected between the pressure lines 38 and 39. A pressure gauge 41 is connected between the two orifices 36 and 37 and registers the pressure at such location.

A second branch of the flow divider 33 includes a pair of check valves 42 and 43, which are interconnected on their downstream side by a manifold pressure line 44. The check valve 42 is connected at its upstream side to the pressure line 39 and the upstream side of the check valve 43 is connected to the pressure line 38.

A single fixed orifice 46 is connected to the pressure line 44 through a branch line 47 and, in the illustrated embodiment, is mounted on the inlet of a pressure regulating valve 48 described in detail below. Downstream from the pressure regulating valve 48 is another check valve 49. Downstream from the check valve 49 is an oxygen outlet 51 through which the oxygen produced by the system (hereinafter referred to as "product") flows to a storage container 52 through a schematically represented supply line 53. Here again, a pressure gauge 54 is provided to indicate the discharge pressure of the oxygen produced by the system, and a pressure switch 56 senses such discharge pressure. It should be noted that there are other flow dividers besides fixed restrictors that are known in the art and could be utilized with this invention.

Normally, the storage tank or container 52 is provided to allow the accumulation of a supply of oxygen under pressure which is subsequently used in any desired manner. For example, if the oxygen generator is utilized in a welding shop or the like, the various torches and applicances are supplied from oxygen contained within the storage container 52. Since such torches are normally used in an intermittent manner, the system can be sized so that the production rate of the system is insufficient to support the simultaneous use of all of the torches or other applicances being operated by the system, but is still sufficient to provide sufficient oxygen for such intermittent operation or usage. Consequently, the storage tank pressure varies widely between relatively low pressures and full system output pressure.

Figure 4:
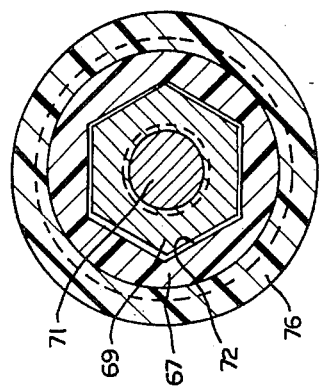
FIG. 4 is a fragmentary cross section taken along line 4—4 of FIG. 3.
Figure 3:
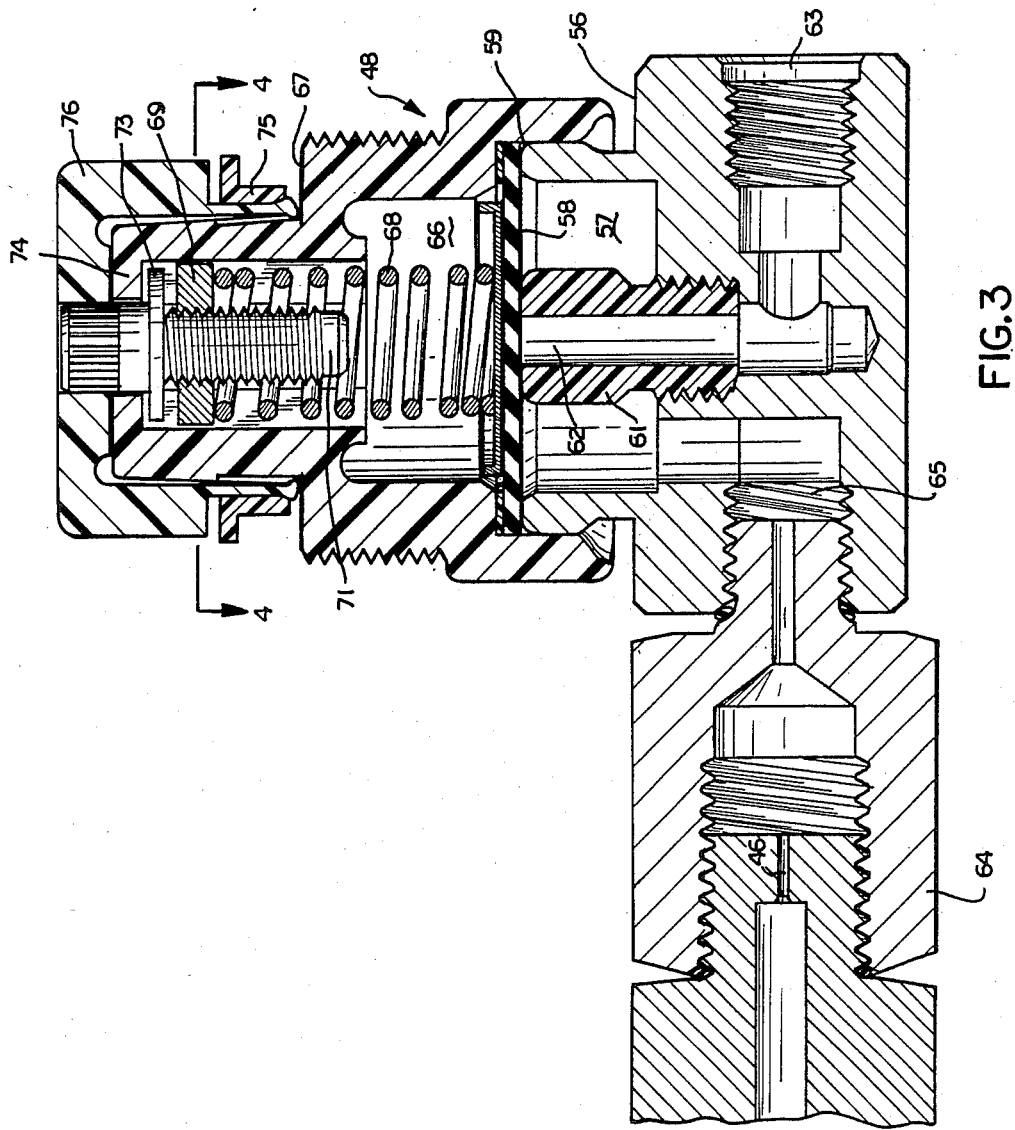
FIG. 3 is a side elevation in section of a preferred back pressure regulating valve for use in a system in accordance with the present invention.

Reference should now be made to FIGS. 3 and 4, which illustrate the structural detail of the pressure regulating valve 48. The valve 48 provides a main body 56 having a control chamber 57 closed at its upper end by a flexible diaphragm 58. The diaphragm 58 is clamped at its periphery against a shoulder 59 around the open end of the control chamber 57. A centrally located, tubular valve member 61 is threaded into the main body 56 and provides a central passage 62 in communication with an outlet port 65 formed in the main body 56. An inlet port 63, also formed in the main body 56, is in communication with the control chamber 57. The orifice 46 is provided in a fitting 64 threaded into the inlet port 63.

A spring chamber 66 is provided on the side of the diaphragm 58 opposite the control chamber by a spring housing 67 mounted on the main body 56. In addition, the spring housing 67 serves to clamp the periphery of the diaphragm against the shoulder 59. Mounted within the spring chamber 66 is a compression spring which extends between an adjusting nut 69 and the diaphragm 58. The adjusting nut 69 is in turn threaded onto an adjusting screw 71 and is provided with a noncircular periphery, as best illustrated in FIG. 4. The nut 69 is positioned within a mating opening 72 so that the nut is free to move axially along the opening but is restrained against rotation relative to the spring housing 67.

The adjusting screw 71 is provided with a shoulder 73 which engages a shoulder 74 on the spring housing 67 to axially locate the adjustment screw while allowing rotation thereof. The upper end of the adjusting screw is press-fitted into an adjusting knob 76. Rotation of the knob 76 rotates the screw and, in turn, adjusts the nut 69 for adjusting the operating pressure of the valve.

For example, when it is desired to increase the force of the spring 68 on the diaphragm 58, the adjusting screw is rotated in a direction which causes the adjusting nut to move down along the passage 72. Conversely, reduction of the spring force can be accomplished by rotating the adjusting screw in the opposite direction. A locking collar 75 is positioned against the lower end on the knob 76 and is raised to permit adjusting rotation of the knob, and when lowered locks the knob against rotation.

The pressure regulating valve 48 and its associated environment form a means for compensating the effluent, usually oxygen to produce substantially constant flow against a variable back pressure. It is anticipated that other structures could be used.

The system operates through repeated cycles as follows. Clean, dry air under pressure is alternately supplied to the beds 10 and 11, one bed being pressurized while the other bed is depressurized and regenerated. The regulator 17 is adjusted to supply air at the desired system supply pressure, which may be, for example, about 65 psi. The control valve 18 is cycled back and forth by an electric timer (not illustrated). During the first half of the full cycle, the control valve is operated to the operative position, in which the supply of air from the regulator 17 is connected through the pressure line 22 to the first absorption bed 10. During this phase or one-half of the cycle, the second absorption bed is connected by the valve 18 to the exhaust muffler 26 through the pressure line 24.

The compressed air flowing up through the absorption bed 10 causes the Zeolite contained within the bed to absorb the nitrogen component of the air so that the oxygen component reaching the upper end of the first absorption bed has a purity of about 90%. As used herein, the component discharged from the pressurized absorption bed is generally referred to as an "effluent" since, within the broader aspects of this invention, the system can be used to separate other components of the compressed fluid passing through the absorption beds containing other types of absorption material. Further, the flow divider may in some instances be useful in other types of systems in which variable back pressure is encountered. The invention is not limited to the production of oxygen per se. For example, oxygen may be absorbed in a similar system with the appropriate Zeolite to produce an effluent of nitrogen.

At the moment when the valve 18 shifts to supply the compressed air to the first bed 10, the pressure within the bed is substantially atmospheric pressure. Therefore, as the compressed air is supplied to the lower end of the bed, the pressure within the bed increases and the pressure of the effluent flowing from the upper end of the bed through the pressure line 38 gradually increases. As the pressure of the first bed 10 increases, the pressure of the effluent correspondingly increases. The pressure previously existing within the second bed 11 decreases relatively abruptly, causing a pressure drop to occur between the pressure lines 38 and 39.

As the differential in pressure between such lines increases, flow of effluent through the two restrictors 36 and 37 increases as a function of the differential pressure across the two restrictors. Similarly, such pressure differential causes the check valve 43 to open and the pressure in the manifold 44 increases with the pressure within the pressure line 38. During such phase of operation, the check valve 42 prevents reverse flow from the manifold 44 to the pressure line 39.

Since the check valves require very low differential pressure to operate, it can be assumed for purposes of discussion that the pressure within the manifold 44 is effectively equal to the pressure within the pressure line 38. The pressure in the manifold 44, which is delivered to the pressure regulating valve 48 through the orifice 46, builds up within the control chamber 57 of the pressure regulating valve. When the pressure acting upon the diaphragm 58 is sufficiently high to overcome the force applied to the diaphragm by the spring 68, the diaphragm lifts off the valve member 61 and communication is provided through the check valve 49 to the storage chamber 52 and a portion of the effluent delivered from the first absorption bed 10 flows into the container 52. The remaining portion of the effluent delivered from the first absorption bed 10 recirculates through the series-connected orifices 36 and 37 to the depressurized bed 11. This regenerates the depressurized bed 11 by causing the Zeolite therein to release the nitrogen component of the air previously absorbed thereby. Therefore, the depressurized bed is automatically prepared for the subsequent cycle of operation.

In practice, it is possible to obtain satisfactory regeneration of the depressurized bed when about 70% of the effluent delivered from the pressurized bed is recirculated through the depressurized bed. Therefore, the flow divider system 33 should function to recirculate about 70% of the effluent and to deliver about 30% of the effluent to the storage container as the product of the system. These percentages vary, however, with the size of the beds, time cycle of the pressurization, incoming pressure, etc.

During the second half of the total cycle of the operation, the timer shifts the control valve 18 to connect the compressed air supply to the second absorption bed 11 through the pressure line 24 and simultaneously connects the lower end of the first bed 10 to the associated muffler 27, causing depressurization of the first bed 10. During this phase of the total cycle, the nitrogen component of the compressed air is absorbed in the second bed 11 and a relatively pure oxygen component or effluent is delivered to the flow divider 33 through the pressure line 39. The build up of pressure in the pressure line 39 occurs, while a corresponding decrease in pressure occurs in the pressure line 38 due to the decompression of the first absorption bed 10. This causes a reverse in the differential pressure across the flow divider and effluent commences to flow through the two orifices 36 and 37 from the pressure line 39 to the pressure line 38 and is, in turn, recirculated down through the first absorption bed to regenerate the bed while the second absorption bed is pressurized and producing the oxygen effluent.

When the differential pressure across the flow divider reverse, the check valve 42 opens and the check valve 43 closes, automatically connecting the manifold 44 to the supply of effluent being delivered from the second absorption bed 11. In operation, the main valve cycles back and forth, causing alternate pressurization of the beds and regeneration of the beds so a substantially constant supply of effluent is produced for delivery to the storage container 52.

In a typical prior art system which does not provide a pressure regulating valve 48, an increase in pressure in the storage container 52 creates back pressure on the orifice 46, and such back pressure results in a decrease in the differential pressure across the orifice 46. In such prior art systems, a condition represented by FIG. 2a occurs, and inefficiencies result.

In such prior art systems, which do not employ a pressure regulating valve as disclosed and claimed herein, the orifice sizes must be selected so that the division of flow at low back pressures is sufficient for regenerating the depressurized bed. Consequently, at low back pressure, a volume of oxygen or effluent represented by the bar 81 is delivered to the storage container during each cycle of operation. However, as the pressure in the storage chamber 52 builds up, a back pressure correspondingly builds up on the orifice 46, causing a differential pressure accross the orifice to decrease. Consequently, during each successive full cycle of the system, the volume of oxygen delivered to the storage container decreases, as represented by the bars 81a, 81b, 81c, 81d, and 81e. Since the effluent volume delivered to the storage container decreases, an excessive amount of effluent is recirculated through the depressurized absorption bed. Consequently, system efficiency deteriorates drastically, and excessive amounts of compressor power are required for a given amount of produce produced.

Figure 2B:
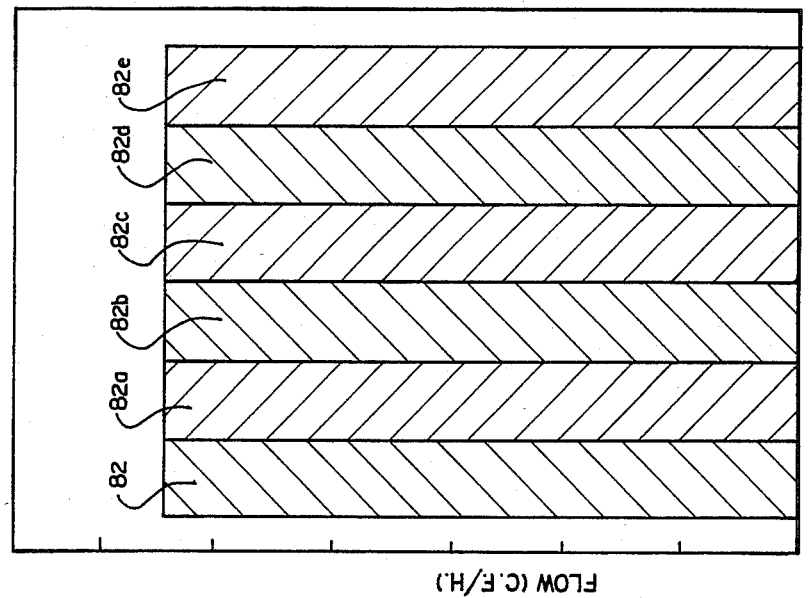
FIG. 2b is a similar diagram illustrating the manner in which the output of a system incorporating this invention is maintained even when the pressure in the product storage container builds up.
Figure 2A:
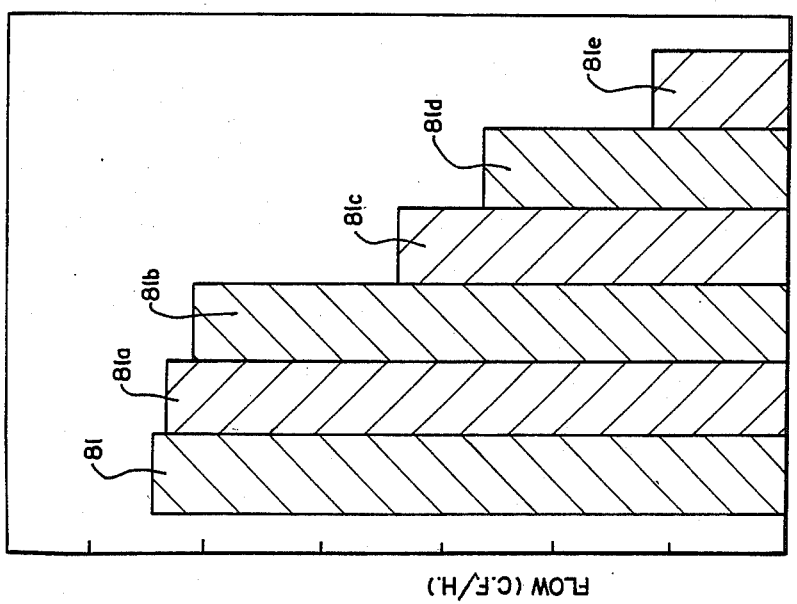
FIG. 2a is a diagram illustrating the manner in which the production of product of an absorption system in accordance with the prior art deteriorates as the product back pressure builds up.

In accordance with the present invention, the inefficiencies existing in the prior art as diagrammatically illustrated in FIG. 2a are eliminated and a system is provided in which the desired flow division of effluent between product and recycling is maintained even when the back pressure on the system increases as the pressure within the storage container 52 builds up. This is diagrammatically illustrated in FIG. 2b, wherein the bar 82 represents the volume of product, which in the illustrated embodiment is oxygen delivered during one complete cycle of operation of the system when the tank pressure is low. As illustrated therein, the bars 82a through 82e, which represent the volume of product produced during succeeding system cycles of operation, remain substantially the same size even when the back pressure of the system builds up as the pressure in the storage container builds up. The production rate is maintained independent of back pressure on the system because the flow divider system 33 functions to automatically maintain a substantially constant division of the effluent independent of system back pressure. For example, if proper regeneration of the depressurized bed requires a recirculation of 70% of the effluent produced, such ratio is maintained in accordance with this invention independent of the back pressure on the system resulting from pressure variations in the storage container 52. Consequently, the system operates with peak efficiency at all times, and the product output of the system is consistently maintained. Therefore, the power requirements for producing the compressed air to operate the system is not adversely affected by variations in storage chamber back pressure.

Figure 5:
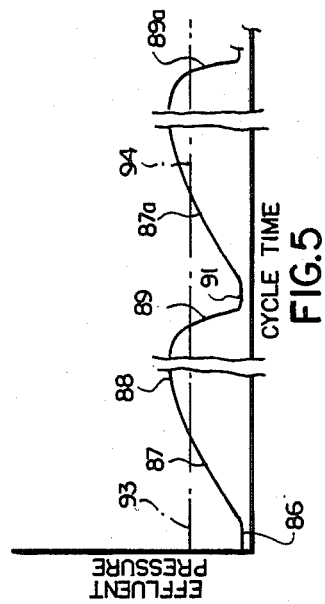
FIG. 5 is a curve illustrating the manner in which the effluent pressure surges during each cycle.

FIG. 5 represents a typical pressure curve of the effluent during one complete cycle of the system. At the beginning of a cycle, the pressure of the effluent produced by the first absorption bed 10 in the passage 38 is relatively low, as indicated at 86. As the first absorption bed 10 is pressurized, the pressure of the effluent increases along a relatively gradual curve 87 to maximum pressure at about 88. When the main control valve 18 is shifted to reverse the connections between the two absorption beds 10 and 11, the pressure of the effluent drops rapidly as the first absorption bed 10 is depressurized through the muffler 26, as indicated by the relatively steep curve 89, until a new low pressure point at 91 is reached. Therefore, the first curve of increasing pressure followed by the portion of the decreasing pressure occurs during one-half of the total cycle. Subsequently, the pressure of the effluent in the pressure line 39 increases as the second absorption bed 11 is pressurized, as indicated by a curve 87a similar to the curve 87. At the end of the cycle when the valve is again shifted back to its original position, the second curve of decreasing pressure 89a exists, indicating the completion of one full cycle. Subsequently, repeated cycles are provided.

Since the manifold 44 is maintained at substantially the same pressure as the pressure line 38 or 39, in which the effluent pressure is building up, the pressure within the manifold 44 delivered to the third orifice 46 follows the same curve as illustrated in FIG. 5.

Reference should now be made to FIG. 3. The spring 68 of the pressure regulating valve maintains the valve closed by maintaining the diaphragm 58 against the valve member 62 when insufficient pressure exists within the control chamber 57 to overcome the force of the spring 68.

As the pressure of the effluent within the control chamber 57 builds up, a pressure-induced force on the diaphragm increases until it equals the force of the spring 68. When this occurs, the diaphragm lifts off the end of the valve member 61 and a connection is provided between the orifice and the storage container. The action of the regulating valve, however, causes the diaphragm to maintain the control chamber at a pressure determined by the force of the spring, so a pressure drop occurs between the control chamber and the outlet 65 which is equal to the regulated pressure in the control chamber minus the back pressure in the storage chamber 52.

Because the regulating valve 48 maintains a substantially constant downstream pressure on the orifice 46, the orifice is effectively isolated from the back pressure within the storage tank and the differential pressure across the orifice 46 is equal to the difference in the pressure of the effluent within the supply line 47 and the regulated pressure. Therefore, the flow rate of product through the orifice 46 to the storage chamber is a function of the differential pressure between the effluent pressure and the regulated pressure. The volume of flow of product is a function of such differential pressure and the time the regulator remains open.

It is recognized that the back pressure in the outlet produces a force on the diaphragm which is a function of the back pressure times the small area of the passage 62. As the back pressure builds up, this back pressure force causes the valve 48 to open at a slightly lower control chamber pressure. This difference, however, is small so it does not significantly affect the amount of flow through the orifice. In fact, it increases the flow through the orifice 46 slightly because the differential pressure across the orifice is increased and the flow continues for a slightly greater time.

Referring to FIG. 5, the flow of product is a function of the area above the line 93-94 (which represents the control pressure of the valve 48) and below the effluent pressure curve. If an increased percentage of product is to be delivered, it is merely necessary to lower the regulating pressure of the valve 48 by decreasing the spring force, and if the percentage of product delivered to the storage chamber is to be increased, it is merely necessary to increase the spring force so as to raise the pressure within the control chamber 57 required to open the regulating valve.

With this invention, a flow divider operates to maintain a substantially constant division between recirculated effluent and product effluent regardless of the back pressure on the total system created by the pressure within the storage chamber. In such system, however, it is necessary to utilize a larger orifice 46 than would otherwise be required in a system not employing a pressure regulating valve because product only flows through the orifice 46 when the effluent pressure exceeds the regulating pressure of the valve.

In one specific embodiment of this invention, the two orifices 36 and 37, which are connected in series, have a diameter of 0.047 inch and the third orifice has a diameter of about 0.042 inch. In such embodiment, the total time of the cycle is about 120 seconds, and optimum performance is obtained when the pressure regulating valve 17 is set at 65 psi and the pressure regulating valve 48 is set to open at about 52 psi. The sizes of the orifices and the setting of the regulating valve 48 will vary for different size beds, incoming pressure, etc. The entire system must always be balanced to provide enough product to cleanse the beds completely. Moreover, systems other than fixed surfaces can be used as flow dividers, such as variable flow valves, etc.

Normally, the pressure switch 56 is connected to the control circuit of the system to terminate the operation of the valve 18 when a desired maximum pressure is reached within the storage chamber 52. When the use of the oxygen stored in the storage chamber 52 causes the pressure to drop, the pressure switch 56 automatically restarts the operation of the system so that a constant supply of oxygen is available for use.

It should be understood that in the illustrated embodiment, two orifices 36 and 37 are connected in series so that a pressure gauge 41 can be provided to monitor the operation of the system regardless of the direction of flow of recirculating effluent. However, such orifices which are connected in series can, if desired, be replaced by a single orifice sized to provide the same restrictive value as the two orifices 36 and 37.

Figure 6:
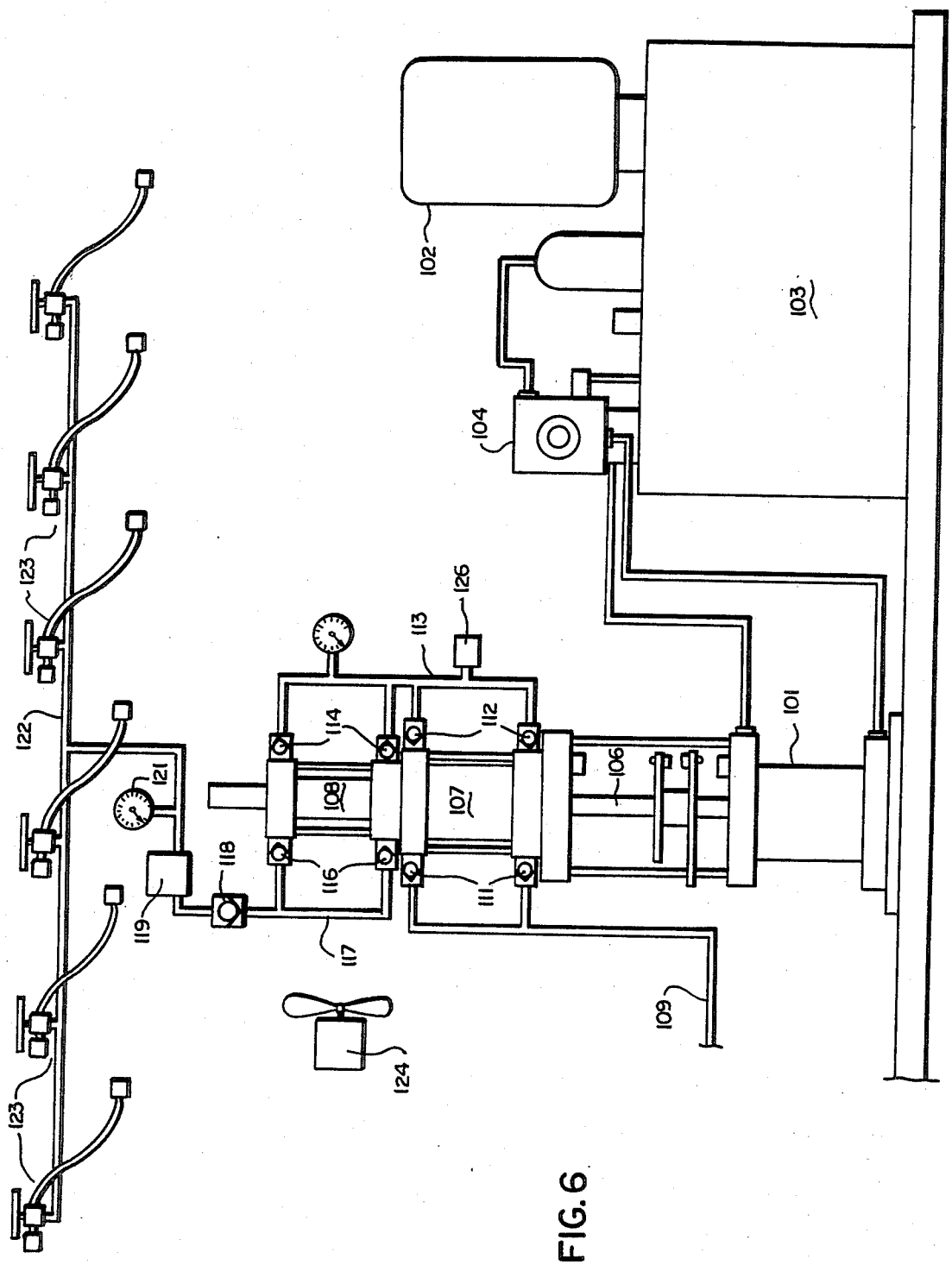
FIG. 6 is a schematic illustration of a pressure boosting system for pressurizing the product for delivery to high pressure storage cylinders.

FIG. 6 illustrates a two-stage compressor system which may be utilized to receive product from the storage container 52 and pressurize the oxygen for filling typical oxygen pressure tanks. Such compressor is powered by a hydraulic piston and cylinder actuator 101. The power for operating the cylinder 101 is provided by a pump and motor 102 which pressurizes hydraulic fluid contained in a reservoir 103 and delivers hydraulic fluid under pressure to a four-way, two-position valve 104. The valve is cyclically operated to cause reciprocation of the piston rod 106 of the actuator 101, which in turn reciprocates a piston contained within a first stage pump 107 and also reciprocates the piston within a second stage pump 108. Oxygen from the storage chamber 52 (illustrated in FIG. 1) is delivered to the first stage pump through a pressure line 109. Such pressure line connects with the two ends of the first stage pump through a pair of similar check valves 111. A second pair of first stage check valves 112 connects the two ends of the first stage pump to a manifold line 113 so that the first stage pump is double-acting and delivers oxygen at increased pressure to the second stage pump 108.

A pair of check valves 114 connect the manifold 113 to the two ends of the second stage pump 108 for further increasing pressure of the oxygen. Similar output check valves for the second stage 116 connect the two ends of the second stage pump to a high pressure manifold 117. From the second stage manifold 117, the high pressure oxygen flows through the check valve 118 past a pressure switch 119 and a pressure gauge 121 to a filler manifold 122.

Connected to the filler manifold 122 are a plurality of valved filler stations 123 each of which may connect to a typical cylinder to be filled with oxygen. An appropriate cooling fan 124 is normally provided to cool the compressor to prevent overheating. Normally, a relief valve 126 is connected to the manifold 113 and is set at about 350 psi. The pressure switch 119 is normally set at about 2000 psi and operates to automatically control the operation of the pump so that an output pressure of 2000 psi is maintained for filling the various cylinders. Here again, because the basic oxygen generator functions with high efficiency, a power efficient overall system is provided, in this instance for charging conventional oxygen cylinders.

With a flow divider incorporating the present invention, a substantially constant ratio is maintained in the divided flow of effluent. In the illustrated embodiment, a simple pressure regulating valve accomplishes this continued accurate flow division, automatically compensating for back pressure variations, and in cooperation with the fixed orifices and check valves, provides a reliable, low-cost system for substantially increasing the output of a given absorption system.

Although the preferred embodiment of this invention has been shown and described, it should be understood that various modifications and rearrangements of the parts may be resorted to without departing from the scope of the invention as disclosed and claimed herein.

What is claimed is:

1. A fluid absorption system comprising regenerative beds operable to cyclically produce effluent in pressure surges, and a flow divider operable to recirculate a substantially constant first percentage of said effluent for regenerating said beds and to deliver a substantially constant second percentage as product against a variable back pressure, said flow divider including first and second branches having flow restrictors therein said first branch operating to deliver said first percentage of effluent for regeneration of said beds said second branch including an automatically compensating pressure regulating valve operable to maintain a pressure differential across the flow restrictors in said second branch which is substantially independent of said back pressure so that said second percentage of product delivered remains substantially constant as said back pressure varies.

2. A fluid absorption system as set forth in claim 1, wherein said flow restrictors are fixed restrictors and said pressure regulating valve is adjustable.

3. A fluid absorption system as set forth in claim 2, wherein said flow restrictors are provided by fixed orifices.

4. A fluid absorption system as set forth in claim 3, wherein said pressure regulating valve is downstream from said fixed orifices in said second branch, said pressure regulating valve opening to allow flow of product only when the pressure of effluent passing through said fixed orifices in said second branch exceeds a predetermined adjusted pressure.

5. A fluid absorption system as set forth in claim 1, wherein said flow restrictors are fixed orifices, and said pressure regulating valve provides a spring-biased diaphragm operable to permit flow through said second branch only when the pressure of effluent therein exceeds a predetermined pressure and a compressor is operably attached to provide air to the regenerative beds and part of said spring-biased diaphragm is operatively exposed to the back pressure so that the back pressure acts with the pressure of the effluent to open the pressure regulating valve and permit flow therethrough.

6. A fluid absorption system as set forth in claim 1, wherein said flow restrictors in said first branch include two similar fixed orifices connected in series, and a pressure gauge is connected between said orifices, said pressure gauge indicating a pressure which is independent of the direction of flow through said first branch.

7. A fluid absorption system as set forth in claim 1, wherein said system is operable to produce oxygen effluent and said back pressure is provided by oxygen product in a storage chamber supplied by said system.

8. A fluid absorption system as set forth in claim 7, wherein compressor means are connected to said storage chamber, said compressor means being operable to increase the pressure of said oxygen for filling oxygen tanks.

9. A fluid absorption system as set forth in claim 8, wherein said compressor means is a two-stage double-acting compressor powered by a double-acting hydraulic actuator.

10. A flow divider for fluid absorption systems in which the effluent is delivered with repeated pressure surges and for delivering a predetermined percentage of said effluent against a variable back pressure, comprising a network having at least two branches with fixed orifices therein, one of said branches being operable to deliver a fixed percentage of said effluent against variable back pressure, said one branch having automatically compensating pressure regulating means maintaining a pressure differential across said fixed orifice therein substantially independent of said back pressure so that said percentage of effluent flowing therethrough will remain substantially constant when said back pressure changes.

11. A flow divider as set forth in claim 10, wherein said pressure regulating means includes a spring-biased diaphragm valve connected downstream from said fixed orifices in said one branch, said pressure regulating means maintaining a downstream pressure on said fixed orifice in said one branch independent of said back pressure by the use of the combination of the back pressure and effluent pressure acting against one side of the diaphragm.

12. An effluent generating system having an absorption and regeneration phase in a cycle comprising at least one absorption regenerative bed operable to produce effluent, said bed adapted to receive a compressed mixture of fluids from a source of said mixture, the bed absorbing a substantial portion of at least one component of said mixture during the absorption phase of the cycle of the system and producing an effluent having a second component of the mixture, a first part of the effluent being used for regeneration, a second part of the effluent operatively connected to exhaust to a variable back pressure, and means for automatically compensating the second part of the effluent to produce a substantially constant flow of the second component of the mixture against the variable back pressure including a pressure regulator operatively attached to receive both the back pressure and the pressure from the effluent.

13. An effluent generating system comprising first and second absorption beds each operable during a first phase when compressed air flows therethrough to absorb at least one component thereof and deliver an effluent, each bed during the second phase operating to release said absorbed component when depressurized and supplied with said effluent, control means connected to said beds operable through repeated cycles to alternately pressurize one bed with compressed air and decompress the other of said beds, a storage chamber for said effluent, and flow divider means connected to said beds and said storage chamber, said flow divider means including a first branch connected between said beds, and a second branch connected between said beds and said storage chamber, said first branch including first fixed orifice means through which effluent flows from the pressurized bed to the depressurized bed, said second branch including check valve means permitting flow therethrough only from said pressurized bed, said second branch also including second orifice means, and pressure regulating means automatically associated with one of said branches, said pressure regulating means maintaining a differential pressure across said orifice means of said one of said branches which compensates for changes in pressure in said storage chamber so that a substantially constant percentage of effluent is automatically delivered to said storage chamber during each of said cycles.

14. An effluent generating system as set forth in claim 13, wherein said pressure regulating means maintains a differential pressure across said second orifice means which is substantially independent of the pressure in said storage chamber.

15. An effluent generating system as set forth in claim 14, wherein compressor means are connected to said storage chamber, said compressor means operating to increase the pressure of said effluent for delivery to high pressure tanks.

16. An effluent generating system as set forth in claim 15, wherein said compressor means is a two-stage double-acting pump powered by a hydraulic actuator.

17. An effluent generating system as set forth in claim 13, wherein said beds are operable to absorb the nitrogent component of compressed air and to deliver an oxygen effluent.

* * * * *